(12) United States Patent
Fu et al.

(10) Patent No.: US 9,238,251 B2
(45) Date of Patent: *Jan. 19, 2016

(54) DUAL-COIL GEOPHONE ACCELEROMETER

(71) Applicant: SAS E&P LTD., Calgary (CA)

(72) Inventors: Zhentang Fu, Calgary (CA); Ming Zhou, Xi'an (CN); Biao Guo, Xi'an (CN); Jiaen Song, Xi'an (CN); Hailong Wang, Xi'an (CN); Qiang Ma, Xi'an (CN); Qiang Guo, Xi'an (CN)

(73) Assignee: SAS E&P Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,552

(22) Filed: Jan. 29, 2014

(65) Prior Publication Data

US 2014/0294227 A1 Oct. 2, 2014

Related U.S. Application Data

(60) Provisional application No. 61/807,635, filed on Apr. 2, 2013.

(51) Int. Cl.
*H04R 1/00* (2006.01)
*H04R 9/06* (2006.01)
(Continued)

(52) U.S. Cl.
CPC . *B06B 1/04* (2013.01); *G01V 1/162* (2013.01); *G01V 1/18* (2013.01); *G01V 1/181* (2013.01);
(Continued)

(58) Field of Classification Search
CPC ....... G01V 1/182; G01V 13/00; G01V 1/162; G01V 1/18; G01V 1/181; G01V 1/183; G01V 1/184; H04R 9/04; B06B 1/04

USPC .......................................................... 381/401
See application file for complete search history.

(56) References Cited

U.S. PATENT DOCUMENTS

| 4,051,718 A | 10/1977 | Meckl et al. |
| 5,119,345 A | 6/1992 | Woo et al. |

(Continued)

FOREIGN PATENT DOCUMENTS

| CN | 1161456 A | 10/1997 |
| CN | 102628960 A | 8/2012 |

(Continued)

OTHER PUBLICATIONS

"Building a Seismograph from Scrap," by Panteleimon Bazanos, published in Science in School, Issue 23: Summer 2012 found in http://www.scienceinschool.org/sites/default/files/teaserPdf/issue23_earthquakes.pdf.

(Continued)

*Primary Examiner* — Matthew Eason
*Assistant Examiner* — Sean H Nguyen
(74) *Attorney, Agent, or Firm* — Goodwin Law; Sean W Goodwin

(57) ABSTRACT

An apparatus and a method for detecting vibration are disclosed. The apparatus comprises a housing, a magnetic structure forming a magnetic field in the housing, and a coil structure in the magnetic field, concentric of the magnetic structure. In response to external vibration, the coil structure and the magnetic structure are movable with respect to each other. The coil structure comprises at least two sets of coils overlapped in space, of which a first coil set is for detecting vibration and a second coil set is for applying control in accordance with a control signal.

20 Claims, 4 Drawing Sheets

(51) Int. Cl.
   *H04R 11/02* (2006.01)
   *B06B 1/04* (2006.01)
   *G01V 1/18* (2006.01)
   *G01V 1/16* (2006.01)
   *G01V 13/00* (2006.01)
   *H04R 9/04* (2006.01)

(52) U.S. Cl.
   CPC ............... *G01V 1/182* (2013.01); *G01V 1/183* (2013.01); *G01V 1/184* (2013.01); *G01V 13/00* (2013.01); *H04R 9/04* (2013.01)

(56) References Cited

U.S. PATENT DOCUMENTS

| | | | |
|---|---|---|---|
| 5,172,345 A | 12/1992 | van der Poel | |
| 5,323,133 A * | 6/1994 | Heath et al. | 335/222 |
| 5,469,408 A | 11/1995 | Woo | |
| 6,922,374 B2 | 7/2005 | Hagedoorn et al. | |
| 8,000,171 B2 | 8/2011 | Hache et al. | |
| 8,139,439 B2 | 3/2012 | Kamata | |
| 2011/0007609 A1* | 1/2011 | Woo | 367/183 |
| 2012/0063263 A1* | 3/2012 | Kamata | 367/38 |

FOREIGN PATENT DOCUMENTS

| | | |
|---|---|---|
| CN | 102901982 A | 1/2013 |
| CN | 202886621 U | 4/2013 |
| EP | 0110431 A1 | 6/1984 |
| EP | 0434702 B1 | 3/1994 |
| RU | 2207522 C | 6/2003 |
| WO | 90/01712 A1 | 2/1990 |

OTHER PUBLICATIONS

CIPO Examiner's Requisition for CA 2,840,916 dated May 21, 2015.

* cited by examiner

DUAL-COIL GEOPHONE ACCELEROMETER

CROSS-REFERENCE TO RELATED APPLICATIONS

This application claims the benefits under 35 U.S.C 119(e) of the U.S. Provisional Application Ser. No. 61/807,635, filed on Apr. 2, 2013, the subject matter of which is incorporated fully herein by reference.

FIELD OF THE DISCLOSURE

The present disclosure generally relates to a seismic data acquisition apparatus, and in particular, a dual-coil, closed-loop geophone accelerometer.

BACKGROUND

Vibration sensors have been used in a variety of areas such as oil and gas exploration, vibration monitoring of buildings, bridges and other civil constructions. As vibration sensors for seismic exploration, earthquake and building vibration monitoring are usually powered by batteries, vibration sensors with low power consumption are generally preferred. Also, it is preferable that vibration sensors are low cost and reliable, and have a wide frequency bandwidth.

Conventional geophones are a type of vibration sensors having been widely used for many years. Conventional geophones have a coil movable in a magnetic field. Movement of the coil triggered by external vibration develops an electronic voltage across the coil terminals, which may be used for determining the characteristics of the external vibration.

For example, European Patent Publication No. 0,110,431 teaches an acceleration-responsive geophone of the type employing a transducer including a sensor coil and a drive coil which are both disposed in a magnetic field produced by a magnet structure. The magnet structure and the coils are mounted within a housing for movement relative to each other. The magnet structure is arranged to reduce the electromagnetic coupling between the sensor coil and the drive coil to substantially zero. The sensor coil is coupled to the input of an electronic amplifier having its output coupled to the drive coil to provide a feedback circuit. The transducer-amplifier combination has the behaviour of a bandpass filter. In order to render the combination substantially temperature-independent, while maintaining its bandpass characteristics over a wide temperature range, the amplifier is a transconductance amplifier having an input impedance and an output impedance which are highly relative to the impedance of the sensor coil and the impedance of the drive coil, respectively. A substantially temperature-independent resistor is connected in series to the drive coil, and connected to an output terminal via which the output signal of the transducer-amplifier can be collected.

U.S. Pat. No. 5,172,345, also published as European Patent No. 0,434,702 and PCT Patent Application No. PCT/NL89/00063, teaches a geophone system for measuring mechanical vibrations such as seismic waves. The geophone system includes a mechanical transducer with an electronic processing circuit. The mechanical transducer includes an inertial mass adapted to be excited by an input acceleration signal and by a force transducer. The excitation is detected by a sensor element and the processing circuits of the geophones control the force transducer and are connected with a central station via a transmission line.

Conventional geophones are low cost, power efficient and reliable. However, their frequency bandwidth is generally narrow (frequency response dropping approximately 12 dB/octave), and their total harmonic distortion (THD) is generally high (approximately 0.1% or −60 dB), rendering them unsatisfactory in the evolving market.

Conventional geophones usually have poor frequency response at low frequency range. As low frequency seismic signals are becoming more commonly used in the seismic industry, for instance, vibrator sweeping frequency now usually starting at approximately 2 Hz or lower, the conventional geophones do not meet the needs of monitoring low frequency vibrations. A sensor with wide bandwidth, in particular with good frequency response in low frequency range, is therefore desired.

Other vibration sensors, such as open-loop and closed-loop micro electromechanical systems (MEMS) sensors, are also available. Based on the sensor structure, they are categorized into two classes: open-loop vibration sensors and closed-loop vibration sensors. The conventional geophones are also open-loop vibration sensors.

Similar to conventional geophones, open-loop vibration sensors are generally economic, reliable, and power efficient. Some open-loop vibration sensor arrangements do not even need a power supply at all, although open-loop MEMS sensors do require power and are an example of an exception to the generalization of being power efficient. However, open-loop vibration sensors generally have a very limited frequency bandwidth and poor THD dampening qualities.

Comparing to open-loop vibration sensors, the closed-loop vibration sensors, such as closed-loop MEMS sensors, have generally larger bandwidth with a range of approximately 3 to 375 Hz and lower THD of approximately 0.001% or −100 dB. However, these sensors are expensive and fragile, rendering them unreliable in some use scenarios.

Moreover, closed-loop vibration sensors are power inefficient. For example, the power consumption of a closed-loop MEMS sensor may be as high as 125 mw or higher. The relatively high power consumption requirement severely prevents closed-loop MEMS sensors from successful entry into the seismic market.

Therefore, there is a desire for a vibration sensor that has small total harmonic distortion, a wide frequency bandwidth with good frequency response at low frequencies, and low power consumption.

SUMMARY

According to one aspect of this disclosure, an apparatus for detecting vibration comprises: a housing, a magnetic structure forming a magnetic field in the housing, and at least two sets of coils overlapped in said magnetic field. The at least two sets of coils are overlapped in space, and are concentric with the magnetic structure. In response to vibration, the coil structure and the magnetic structure are movable with respect to each other with the moving directions unparallel to the directions of the magnetic flux of the magnetic field.

According to another aspect of this disclosure, a first coil set of the at least two sets of coils outputs a data signal indicative of vibration.

According to yet another aspect of this disclosure, a second coil set of said at least two sets of coils receives a control signal for controlling the response of the apparatus to vibration.

According to still another aspect of this disclosure, the response of the apparatus to vibration comprises at least one of the sensitivity to vibration and the frequency response to vibration.

According to another aspect of this disclosure, the at least two sets of coils comprise an inner coil set and an outer coil set, the inner coil set being radially offset within the outer coil set. The inner coil set outputs a data signal indicative vibration, and said outer coil set receives a control signal for controlling the response of the apparatus to vibration. Alternatively, the outer coil set outputs a data signal indicative of vibration, and said inner coil set receives a control signal for controlling the response of the apparatus to vibration.

According to another aspect of this disclosure, the coil structure is movable. Alternatively, the magnetic structure is movable.

According to another aspect of this disclosure, a method of detecting vibration is disclosed, the method comprising: forming a magnetic field; overlapping at least a first coil set and a second coil set in space; positioning the at least a first coil set and a second coil set in said magnetic field such that, in response to said vibration, the magnetic field and the at least a first coil set and a second coil set are movable with respect to each other with moving directions unparallel to the directions of the magnetic flux of the magnetic field; detecting, from said first coil set, a data signal bearing information of said vibration; and applying a control signal to said second coil set for controlling said data signal.

According to another aspect of this disclosure, the method further comprises, in response to said vibration, moving said at least a first coil set and a second coil set in said magnetic field.

DETAILED DESCRIPTION

Figure 1:
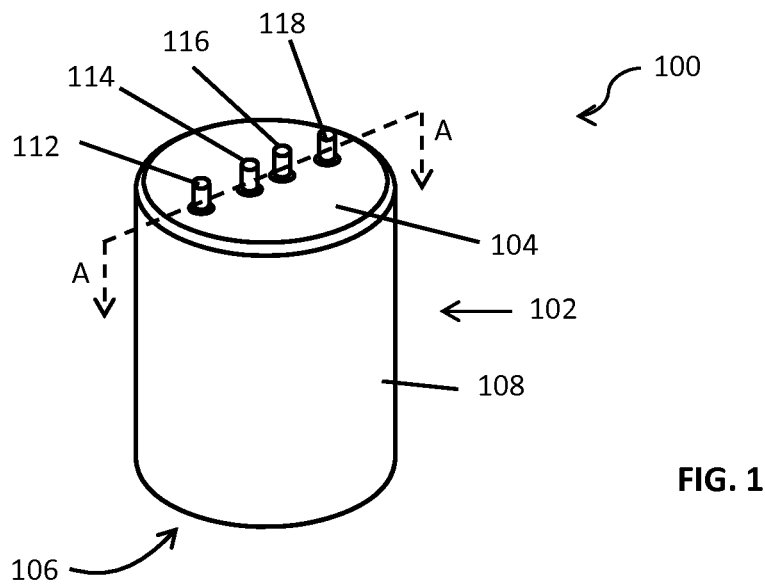
FIG. 1 is a perspective view of a dual-coil, four-terminal geophone, according to one embodiment.
Figure 2:
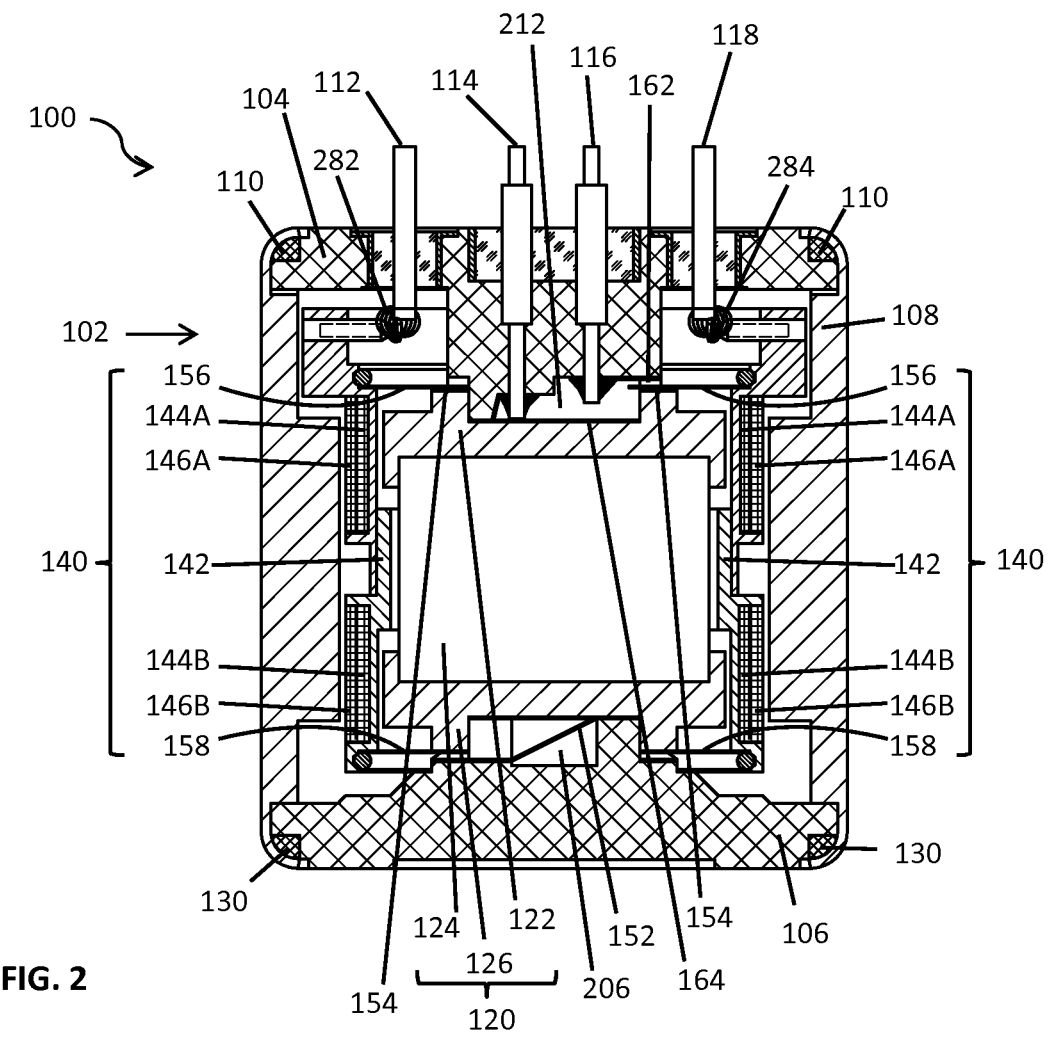
FIG. 2 is a cross-sectional view of the geophone of FIG. 1 along section A-A.

With reference to FIGS. 1 and 2, a four-terminal geophone 100 comprises a cylindrical housing 102 having a cap 104, a base 106, and a cylindrical wall 108 extending therebetween. In this embodiment, the cylindrical wall 108 is mechanically and sealably coupled to the cap 104 and the base 106, respectively, using a crimping structure with a seal element 110 such as an O-ring therebetween.

Figure 3:
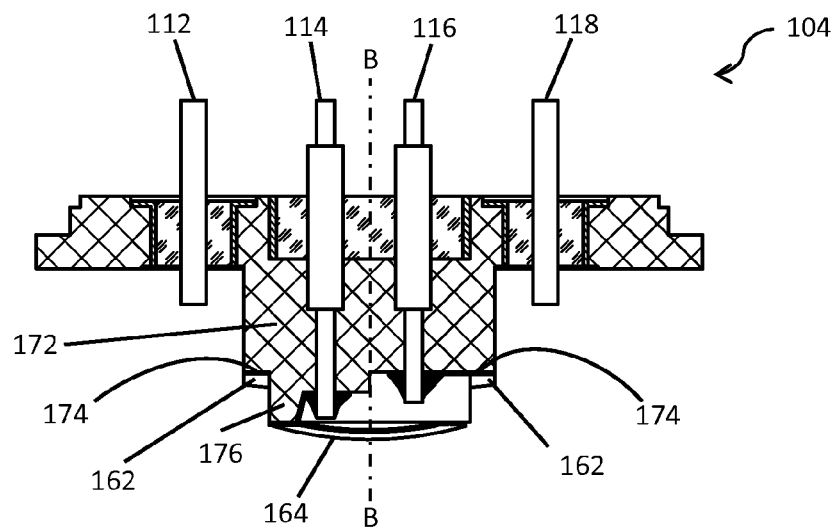
FIG. 3 is an enlarged, cross-sectional view of the cover of the geophone of FIG. 2.

Referring to FIGS. 2 and 3, the cap 104 comprises a central portion 172 extending downwardly from a bottom surface. The central portion 172 comprises an annular shoulder 174 along its periphery and a downwardly extending extrusion 176 spaced radially inwardly from the shoulder 174. An electrical contactor 162 is mounted on the shoulder 174, and is connected to the terminal 116 via an electrically conductive wire or connection (not shown). A downwardly biased reed or spring plate electrical contactor 164 is mounted on the extrusion 176 and extending generally horizontally towards a center of the cap 104.

The cap 104 comprises four terminals 112 to 118 extending outwardly from the inner side of the cap 104 to the outer side thereof for electrically connecting to external signal processing circuits and/or devices (not shown). The bottom end of terminal 114 is positioned about the spring plate contactor 164 such that it is in electrical contact with the spring contactor 164 when the geophone is assembled. Other terminals 112, 116 and 118 do not contact the spring plate contactor 164.

Figure 4:
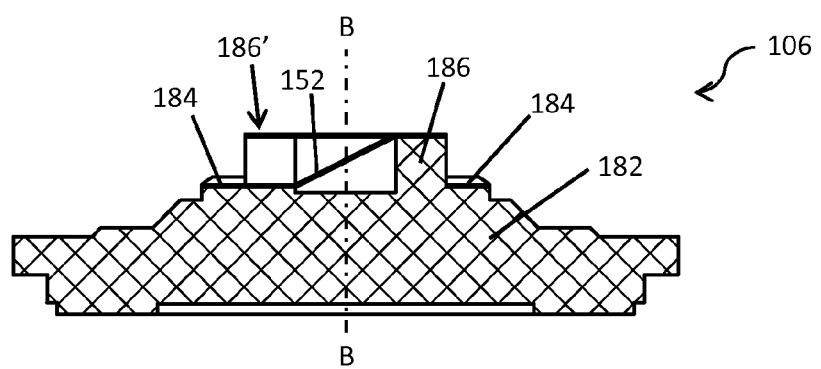
FIG. 4 is an enlarged, cross-sectional view of the base of the geophone of FIG. 2.

Referring to FIGS. 2 and 4, the base 106 comprises a central portion 182 extending upwardly from a top surface. The central portion 182 comprises an annular shoulder 184 along its peripheral and an upwardly extending annular extrusion 186 spaced radially inwardly from the shoulder 184. The annular extrusion 186 is discontinuous, forming a gap 186' for allowing a portion of a spring plate electrical contactor 152 to pass therethrough. The spring plate contactor 152 is mounted on the shoulder 184, a portion of which passes through the gap 186' and extends upwardly and inwardly from the shoulder 184 to the top surface of the extrusion 186.

Referring back to FIGS. 1 and 2, the cylindrical wall 108 is made of a suitable ferromagnetic material, such as steel, iron, nickel, cobalt or the alloy thereof, to facilitate the magnetic structure 120 in forming a desired magnetic field (described later). In this embodiment, the cap 104 and the base 106 are made of rigid plastic to provide mechanical strength for supporting the components enclosed in the housing 102.

The housing 102 encloses therein a vertically movable, annular coil structure 140 and a magnetic structure 120 positioned inside the annular coil structure 140, with their longitudinal axes coinciding or concentric.

Referring to FIG. 2, the magnetic structure 120 is a vertically extending, cylindrical structure vertically firmly fit within the housing 102 between the cap 104 and the base 106. The magnetic structure 120 has a diameter smaller than that of the housing 102 such that an annular space is formed between the magnetic structure 120 and the housing 102 for accommodating the movable coil structure 140.

Figure 5:
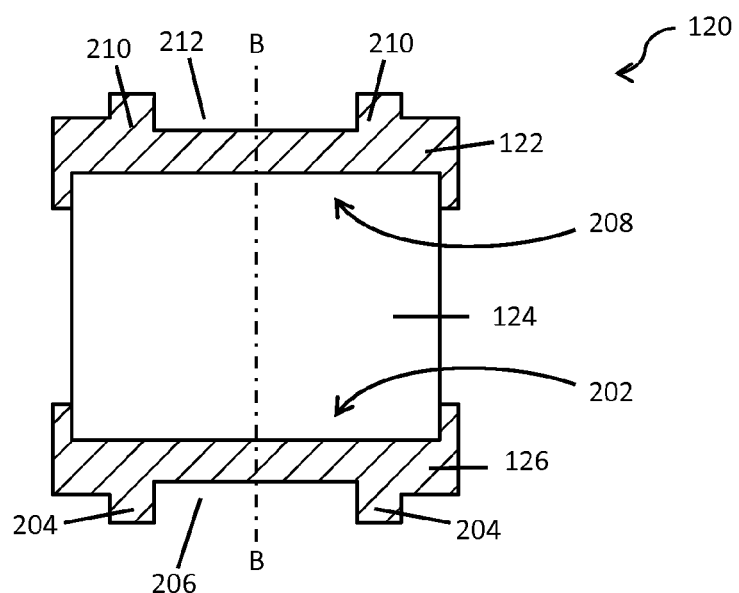
FIG. 5 is an enlarged, cross-sectional view of the magnetic structure of the geophone of FIG. 2.

Referring to FIGS. 3, 4 and 5, the magnetic structure 120 is guided axially within the housing 102, and comprises a magnet block 124 coupled to an upper magnetic boot 122 thereabove, and coupled to a lower magnetic boot 126 therebelow. In this embodiment, the lower magnetic boot 126 has a diameter larger than that of the magnetic block 124, and comprises a first recess 202 on its upper surface for receiving the bottom of the magnetic block 124. The lower magnetic boot 126 also comprises a ring ridge 204 on its bottom surface, centered about the longitudinal axis B-B of the magnetic structure 120 and extending downwardly to form a second recess 206. The position of the ring ridge 204 matches that of the shoulder 184 of the base 106 such that, when assembled, the ring ridge 204 rests upon the shoulder 184, and the outer sidewall of the extrusion 186 of the base 106 is in contact with the inner sidewall of the second recess 206 of the lower magnetic boot 126 to guide the magnetic structure 120 and to prevent the magnetic structure 120 from moving horizontally. Moreover, the height of the ring ridge 204 is such that its bottom surface engages the top surface of the extrusion 186 of the base 106 when assembled.

Similarly, the upper magnetic boot 122 has a diameter larger than that of the magnetic block 124, and comprises a first recess 208 on its bottom surface for fitting to the top of the magnetic block 124. The upper magnetic boot 122 also comprises a ring ridge 210 on its top surface, centered about the longitudinal axis of the magnetic structure 120 and extending upwardly to form a second recess 212. The position of the ring ridge 210 matches that of the shoulder 174 of the base 106 such that, when assembled, the ring ridge 204 is positioned under the shoulder 174 and the outer sidewall of the extrusion 176 of the cap 104 is in contact with the inner sidewall of the second recess 212 of the upper magnetic boot 122 to prevent the magnetic structure 120 from moving horizontally. Moreover, the height of the ring ridge 210 matches that of the extrusion 176 of the cap 104 such that its top surface engages the bottom surface of the extrusion 176 of the cap 104 when assembled.

Figure 6:
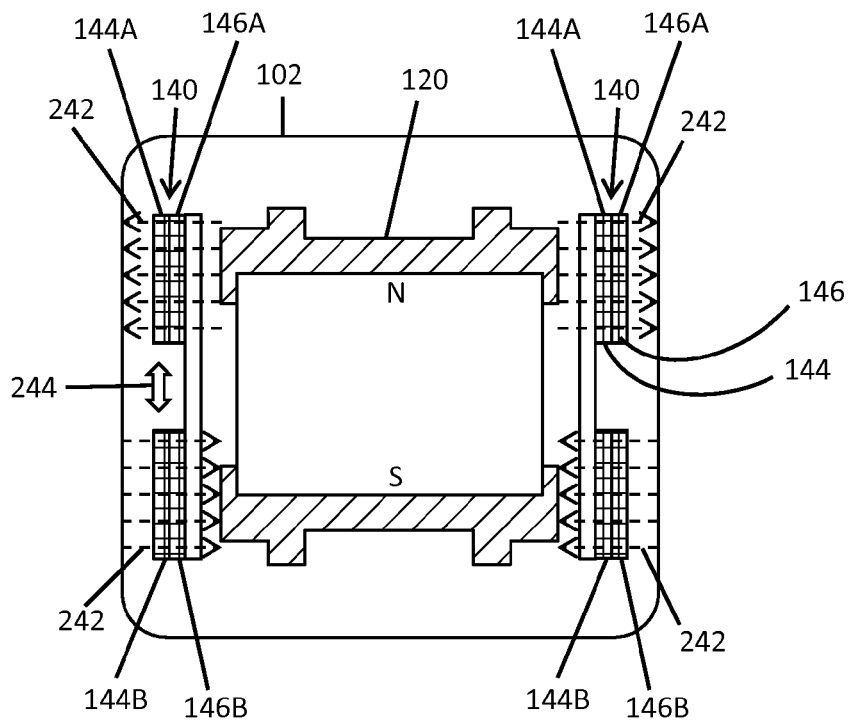
FIG. 6 illustrates the magnetic field formed by the magnetic structure of the geophone of FIG. 2, with arrows indicating magnetic flux.

In this embodiment, the magnetic block 124 is a permanent magnet, and the upper and lower magnetic boots 122 and 126 are made of ferromagnetic material such as steel, iron, nickel, cobalt, or the alloy thereof. The magnetic block 124 and the upper and lower magnetic boots 122 and 126 form a stable, circular magnetic field inside the housing 102. As the cylindrical wall 108 is also made of a suitable ferromagnetic material, it regulates the magnetic field formed by the magnetic structure 120 such that the magnetic flux of the magnetic field generally distributed horizontally in the annular space between the magnetic structure 120 and the housing 102, as illustrated in FIG. 6, indicated by the arrows 242.

Figure 7:
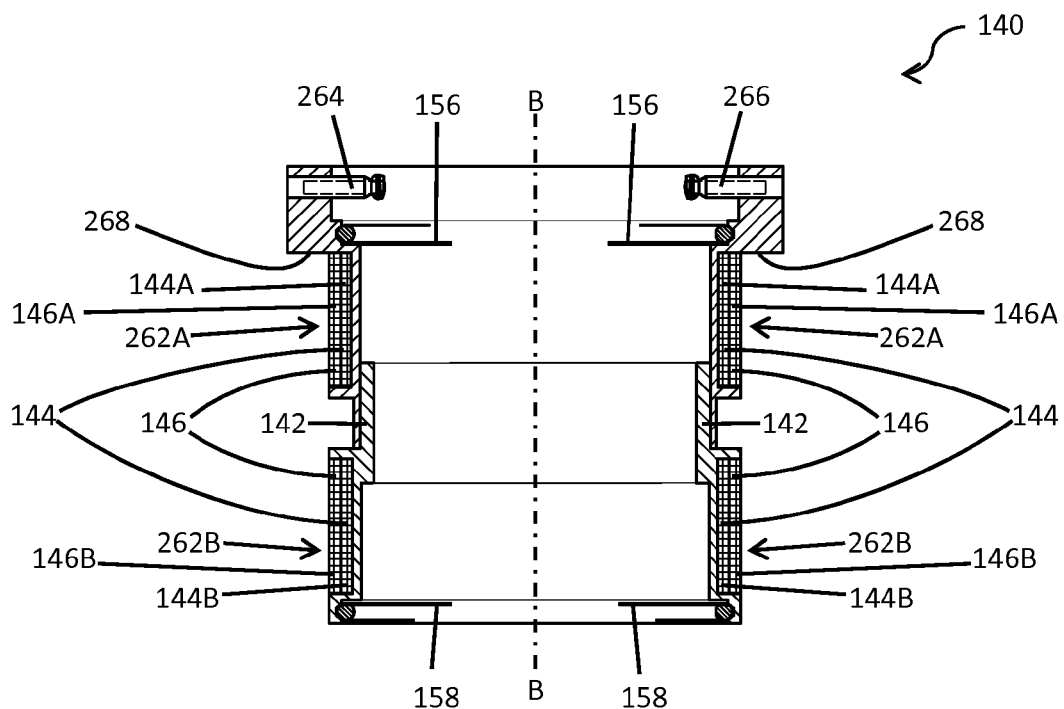
FIG. 7 is an enlarged, cross-sectional view of the movable coil structure of the geophone of FIG. 2.

With reference also to FIG. 7, the movable coil structure 140 comprises a bobbin 142 for supporting coil windings thereon. The bobbin 142 in this embodiment is a tubular or hollow cylindrical structure made of aluminum or aluminum alloy processed by anodic oxidation treatment to form an electrically insulating coat of anodic oxide film on its surface. The upper end of the bobbin 142 slightly expands radially outwardly to form a stop shoulder 268 generally facing downwardly. The upper end of the bobbin 142 comprises a pair of electrical terminals 264 and 266 mounted thereon, and generally inwardly extending from the inner surface thereof. The electrical terminals 264 and 266 are electrically insulated from the bobbin 142.

The upper end of the bobbin 142 also comprises at least one hole (not shown) for wiring a coil set 144 (described later) therethrough to connect to the electrical terminals 264 and 266. On its exterior sidewall, the bobbin 142 comprises a pair of axially spaced upper annular recess 262A and lower annular recess 262B for receiving coils wound therein.

The movable coil structure 140 also comprises a top annular metal spring plate 156 and a bottom annular metal spring plate 158 mounted on the upper and lower ends of the bobbin 142, respectively. The top annular spring plate 156 extends generally horizontally and inwardly from the inner side surface of the bobbin 142 to a position about the ring ridge 210 of the upper magnetic boot 122. The bottom annular spring plate 158 also extends generally horizontally and inwardly from the inner side surface of the bobbin 142 to a position about the ring ridge 204 of the lower magnetic boot 126.

The movable coil structure 140 further comprises two sets of coils 144 and 146 wound on the bobbin 142, with the inner coil set 144 being radially offset within the outer coil set 146. The inner coil set 144 is wound on the bobbin 142, and comprises an upper portion 144A wound in the upper recess 262A of the bobbin 142 and a lower portion 144B wound in the lower recesses 262B thereof. The winding direction of the lower portion 144B of coil set 144 is opposite to that of the upper portion 144A thereof. One end of the inner coil set 144 is connected to the electrical terminal 264, and the other end thereof is connected to the electrical terminal 266.

Figure 8:
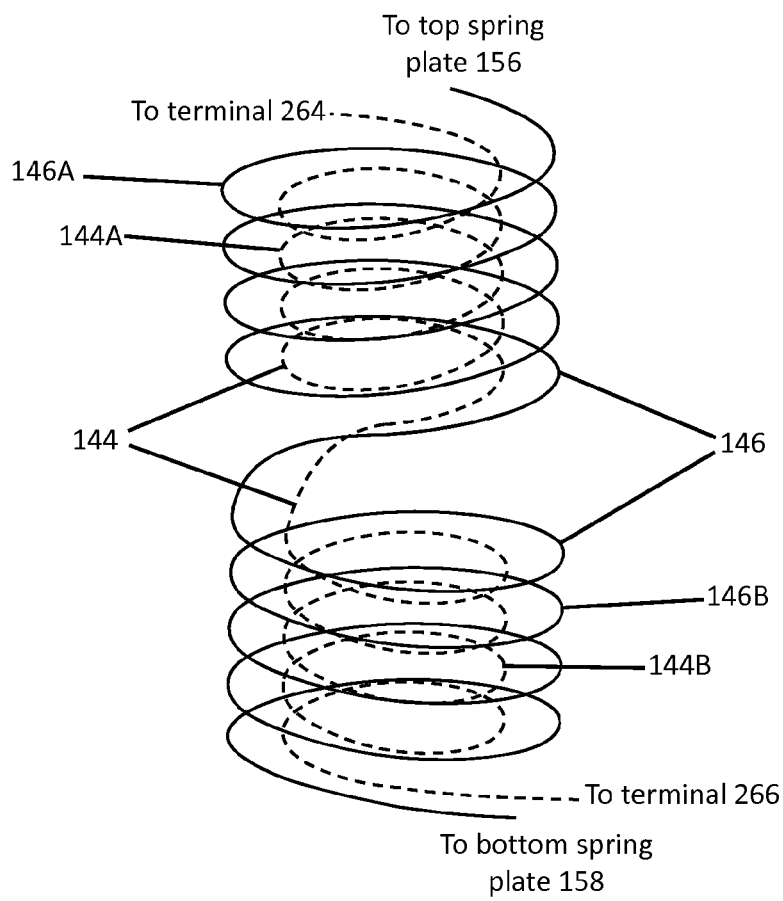
FIG. 8 is a simplified three-dimensional illustration of the windings of the inner and outer coil sets of the movable coil structure of FIG. 7.

The outer coil set 146 is wound over the inner coil set 144. Similar to the inner coil set 144, the outer coil set 146 also comprises an upper portion 146A and a lower portion 146B. As shown in FIG. 8, the upper portion 146A of coil set 146 is wound over the upper portion 144A of coil set 144 in the upper recess 262A of the bobbin 142, and the lower portion 146B of coil set 146 is wound over the lower portion 144B of coil set 144 in the lower recess 262B of the bobbin 142, with a winding direction opposite to that of the upper portion 146A. In this embodiment, the upper and lower portions 146A and 146B of the outer coil set 146 are directly wound on the upper and lower portions 144A and 144B of the inner coil set 144, respectively. However, those skilled in the art appreciate that the outer coil set 146 may be wound over the inner coil set 144 with an annular separation therebetween. For example, the inner coil set 144 may be wrapped by a piece of protection paper and the outer coil set 146 is wound on the protection paper.

The outer coil set 146, the inner coil set 144 and the magnetic structure 120 are in a concentric configuration with longitudinal axes B-B that coincide. One end of the outer coil set 146 is electrically connected to the top spring plate 156, and the other end of the outer coil set 146 is electrically connected to the bottom spring plate 158. FIG. 8 shows a simplified three-dimensional illustration of the positions of inner and outer coil sets 144 and 146.

When assembled as shown in FIG. 2, the cylindrical sidewall 108 is crimped onto the base 106. An O-ring 130 is used to seal the interface between the sidewall 108 and the base 106. Inside the sidewall 108, the magnetic structure 120 is fit onto the base 106. In particular, the ring ridge 204 of the lower magnetic boot 126 rests upon the shoulder 184 of the base 106 with the bottom spring plate 158 of the movable coil structure 140 sandwiched therebetween. The inner sidewall of the ring ridge 204 engages the outer sidewall of the extrusion 186 of the base 106 to prevent the magnetic structure 120 from moving horizontally.

As the bottom spring plate 158 of the movable coil structure 140 is sandwiched between the ring ridge 204 of the lower magnetic boot 126 and the shoulder 184 of the base 106, the bottom spring plate 158 of the movable coil structure 140 is in contact with the spring plate contactor 152 on the shoulder 184 of the base 106 therebelow, and is also in contact with the ring ridge 204 of the lower magnetic boot 126 thereabove. The spring plate 152, in turn, is in contact with the bottom surface of the second recess 206 of the lower magnetic boot 126.

The housing 102 comprises top and bottom annular recesses for receiving the cap 104 and base 106, respectively, and spacing them apart. When assembled, the top spring plate 156 of the movable coil structure 140 is in contact with the electrical contactor 162 on the shoulder 174 of the cap 104 thereabove. However, the top spring plate 156 of the movable coil structure 140 rests on the ring ridge 210 of the upper magnetic boot 122 therebelow via an insulation washer 154 such that the top spring plate 156 is electrically insulated from the ring ridge 210 of the upper magnetic boot 122.

As the height of the ring ridge 210 of the upper magnetic boot 122 matches that of the extrusion 176 of the cap 104, when assembled, the top surface of the second recess 212 of the upper magnetic boot 122 is pressed against the spring contactor 164, which, in turn, is pressed against the terminal 114 in the cap 104. The electrical terminals 264 and 266 are connected to terminals 112 and 118 via spring electrical wires 282 and 284, respectively.

After the cap 104 is pressure-fit and crimped to the top of the cylindrical sidewall 108, the cap 104 presses the magnetic structure 120 to the base 106 to vertically firmly fix the magnetic structure 120 in the housing 102. The movable coil structure 140 is mounted in the housing 102 with the upper spring plate 156 being firmly held between the cap 104 and the upper magnetic boot 122, and the lower spring plate 158 being firmly held between the lower magnetic boot 126 and the base 106. The movable coil structure 140 is therefore constrained laterally, but movable axially within the housing 102 upon external force, such as seismic motions, urging the geophone 100.

The four terminals 112 to 118 are divided into two terminal groups, each connecting to a coil set 144 or 146 when the geophone 100 is assembled. Two circuits are thus formed. The first circuit includes the terminal 112 on the cap 104, which is electrically conductively connected via the electrical wire 282 to the terminal 264 on the movable coil structure 140. The terminal 264, in turn, is conductively connected to one end of the inner coil set 144. The other end of the inner coil set 144 is conductively connected to the terminal 266 on the movable coil structure 140, which is conductively connected to the terminal 118 on the cap 104 via the electrical wire 284. The first circuit is completed when the terminals 112 and 118 are connected to an external electrical circuit and/or device.

The second circuit includes the terminal 114 on the cap 104, conductively connecting via the electrical contactor 164 to the upper magnetic boot 122. The upper magnetic boot 122 is in turn conductively connected to the magnet block 124 and the lower magnetic boot 126 as they are made of electrically conductive material. The lower magnetic boot 126 is conductively connected via the electrical contactor 152 to the bottom spring plate 158, which is connected to one end of the outer coil set 146. The other end of the outer coil set 146 is connected to the top spring plate 156. The top spring plate 156 is conductively connected to the terminal 116 via the electrical contactor 162. The top spring plate 156 is electrically insulated from the upper magnetic boot 122 to avoid forming a short circuit. The second circuit is completed when the terminals 114 and 116 are connected to an external electrical circuit and/or device.

In use, one or more geophones 100 may be deployed in a jobsite, buried or attached to the ground or an object, for sensing vibration or seismic motions. Vertical vibration of the object causes the housing 102 and the magnetic structure 120 to vibrate axially. As the coil structure 140 is suspended to the housing via spring plates 156 and 158, it vertically vibrates with a time lag because of the inertia thereof. Therefore, effectively, the coil structure 140 is vertically vibrating with respect to the magnetic structure 120. As illustrated in FIG. 6, the direction 244 of the wire in coil sets 144 and 146 is generally perpendicular to the direction 242 of the magnetic flux and the winding direction of the coil sets 144 and 146.

As is well known to the skilled person in the art, the movement of a conductor in a magnetic field with a moving direction unparallel to the direction of the magnetic flux causes a voltage with a direction perpendicular to both the direction of the magnetic flux and the moving direction of the conductor. On the other hand, an electrical current flowing in a conductor in a magnetic field with a direction of the current unparallel to that of the magnetic flux will causes a mechanical force with a direction perpendicular to both the direction of the current and that of the magnetic flux. The geophone 100 has two sets of coils 144 and 146. Therefore, one of the inner and outer coil sets 144 and 146, e.g., the inner coil set 144 in this embodiment, is used for sensing vibration, and the other of the inner and outer coil sets 144 and 146, e.g., the outer coil set 146, is used for regulating the movement of the coil structure 140 to control the response, such as the sensitivity and/or frequency response, of the geophone 100 to external vibration.

Figure 9:
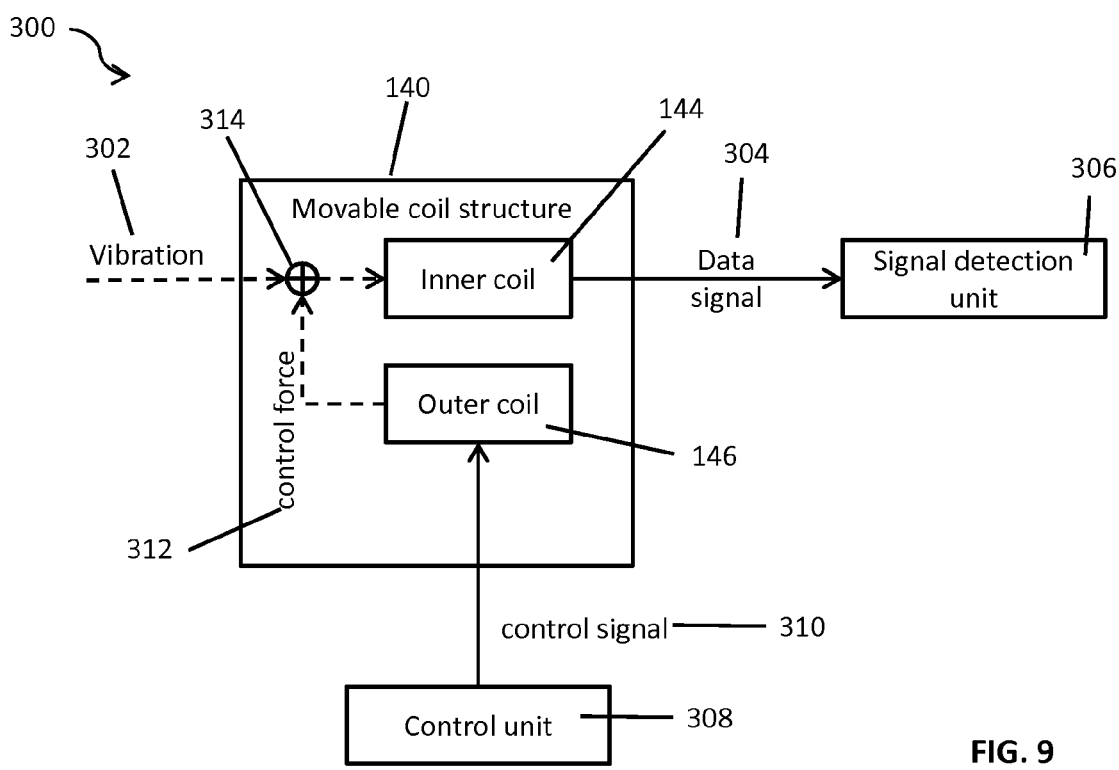
FIG. 9 illustrates a schematic of a generalized vibration detection system employing a geophone, according to embodiments described herein.

FIG. 9 illustrates a generalized vibration detection system employing a geophone 100. In this figure, the solid lines represent the electrical paths, and the broken lines represent the mechanical force paths.

As shown in FIG. 9, external vibration 302, which is a mechanical force with varying strength and direction, applied to the geophone 100 causes the coil structure 140 to move in the magnetic field of the magnetic structure 120, which generates an electrical data signal 304 that is detected by the signal detection unit 306. As the skilled person understands, the data signal 304 bears the information of the vibration 302. A signal processing unit (not shown) in the signal detection unit calculates the characteristics of the vibration 302 based on the electrical data signal 304. The ability of determining the characteristics of the vibration 302 based on the electrical data signal 304 may be described in terms of the frequency response and the sensitivity of the system 300 to the vibration 302.

In the mean time, a control unit 308 applies a control signal 310 to the outer coil set 146, which causes a mechanical control force 312 superimposed (314) with the vibration 302 and applied to the movable coil structure 140. By applying a carefully designed control signal 310 in accordance with the vibration 302 and/or the electrical and mechanical characteristics of the geophone 100, the strength and direction of the applied control force may be adjusted to control the data signal such that the response, such as the sensitivity and/or frequency response, of the geophone 100 to the external vibration is improved. In some embodiments, the control unit 308 generates the control signal 310 based on the data signal 304 detected by the signal detection unit 306, i.e., the control signal 310 is a function of the data signal 304, forming a closed-loop control system. In some other embodiments, the control unit 308 generates the control signal 310 based on other measurement, e.g., a direct measurement of the vibration, obtained using devices or components independent to the signal detection unit 306, forming an open-loop control system.

As skilled persons in the art appreciate, an axially oriented magnet, such as the magnetic structure 120 of the geophone 100, provides a magnetic field with an upper, and a lower, three-dimensional area having strongest magnetic field strength about the top and bottom ends thereof, respectively. Some prior art geophones, such as that disclosed in the aforementioned U.S. Pat. No. 5,172,345, comprises a signal-output coil positioned about the top end of the magnetic structure and a control coil positioned about the bottom end of the magnetic structure. Thus, neither the signal-output coil nor the control coil fully utilizes the magnetic field.

On the other hand, in the geophone 100 disclosed herein, the inner and outer coils are overlapped in space, each having a first portion of coils and a second portion of coils positioned in the upper and lower areas of the strongest magnetic field strength, respectively. Therefore, both the inner coil set 144 and the outer coil set 146 generally fully utilize the magnetic field provided by the magnetic structure 120 for generating vibration-related data signal 304 and for applying control based on the control signal, respectively, giving rise to improved frequency response and/or sensitivity to vibration.

Other embodiments are also readily available. For example, in an alternative embodiment, the outer coil set 146 is connected to a signal detection unit for detecting external vibration, and the inner coil set 144 is connected to a control unit for applying a control signal to control the response, such as the sensitivity and/or frequency response, of the geophone to external vibration.

Although in above embodiments, the cap 104, the cylindrical wall 108 and the base 106 are coupled using a crimping structure, in an alternative embodiment, the cylindrical wall 108 may be coupled to the cap 104 and the base 106 using other suitable fastening method and/or fasteners such as threads, clips, screws, flanges, nuts and bolts, glue, or the like.

In yet another embodiment, the upper magnetic boot 122, the magnetic block 124 and the lower magnetic boot 126 may be coupled using other suitable fastening method and/or fasteners such as threads, clips, screws, flanges, nuts and bolts, glue, or the like.

As skilled persons in the art appreciate, the upper magnetic boot 122, the magnetic block 124 and the lower magnetic block 126 may alternatively be made of other magnetic and/or ferromagnetic materials, or be electromagnetic structures suitable for forming a generally uniform and stable, circular magnetic field within the housing 102.

Although in above embodiments, the geophone 100 comprises a magnetic structure 120 fixed in the housing 102 and a coil structure 140 vertically movable in the housing 102, in still an alternative embodiment, the geophone 100 comprises a coil structure 140 fixed in the housing 102 and a magnetic structure 120 vertically movable in the housing 102. Similarly, the coil structure 140 comprises two sets of overlapped coils, including an inner coil set 144 wound on a bobbin 142 and an outer coil set 146 wound over the inner coil set 144.

Although in above embodiments, the housing 102 comprises a cap 104, a cylindrical wall 102 and a base 106, in an alternative embodiment, the housing 102 is an integrated structure made of a suitable ferromagnetic material.

Although in above embodiments, the housing 102 generally has a cylindrical shape, in an alternative embodiment, the housing 102 may be of another suitable shape, e.g., a cubic shape. Similarly, the magnetic structure 120 and/or the coil structure 140 may alternatively have other suitable shapes, e.g., a cubic shape, in alternative embodiments.

In an alternative embodiment, each of the two coil sets 144 and 146 may only comprise a single portion of coil positioned only at one end of the magnetic structure 120.

What is claimed is:

1. An apparatus for detecting vibration, said apparatus comprising:
    a housing;
    a magnetic structure forming a magnetic field in the housing; and
    a coil structure comprising at least a first and a second set of coils in said magnetic field, each of said first and second sets of coils comprising a first end and a second end for signal processing circuitry connection, said at least first and second sets of coils overlapped in space being concentric with the magnetic structure; wherein
    in response to said vibration, said coil structure and said magnetic structure are movable with respect to each other with the moving directions unparallel to the directions of the magnetic flux of the magnetic field.

2. The apparatus of claim 1 wherein the first coil set outputs a data signal indicative of vibration.

3. The apparatus of claim 1 wherein the second coil set receives a control signal for controlling the response of the apparatus to vibration.

4. The apparatus of claim 3 wherein said response of the apparatus to vibration comprises at least one of a sensitivity to vibration and a frequency response to vibration.

5. The apparatus of claim 3 wherein said control signal is a function of the data signal.

6. The apparatus of claim 1 wherein one of said first and second sets of coils is an inner coil set and the other of said first and second sets of coils is an outer coil set, the inner coil set being radially offset within the outer coil set.

7. The apparatus of claim 6 wherein said inner coil set outputs a data signal indicative vibration, and said outer coil set receives a control signal for controlling the response of the apparatus to vibration.

8. The apparatus of claim 6 wherein said outer coil set outputs a data signal indicative of vibration, and said inner coil set receives a control signal for controlling the response of the apparatus to vibration.

9. The apparatus of claim 6 wherein said coil structure further comprises a hollow cylindrical structure, and said inner coil set being wound thereabout.

10. The apparatus of claim 1 wherein said coil structure is movable.

11. The apparatus of claim 1 wherein said at least a portion of said housing is made of ferromagnetic material for regulating said magnetic field.

12. The apparatus of claim 1 wherein said magnetic structure is received in the coil structure.

13. The apparatus of claim 1 further comprises at least two groups of electrical terminals connectable from outside the housing.

14. The apparatus of claim 13 wherein each group of electrical terminals connect a coil set.

15. The apparatus of claim 13 wherein one of the at least two groups of electrical terminals connects a coil set via the magnetic structure.

16. A method of detecting vibration comprising:
    forming a magnetic field;
    overlapping at least a first coil set and a second coil set in space, each of said first and second coil sets comprising a first end and a second end for signal processing circuitry connection;
    positioning said coil sets in said magnetic field such that, in response to said vibration, the magnetic field and the coil sets are movable with respect to each other with moving directions unparallel to the directions of the magnetic flux of the magnetic field;
    detecting, from the first and second ends of said first coil set, a data signal bearing information of said vibration; and
    applying a control signal to the first and second ends of said second coil set for controlling said data signal.

17. The method of claim 16 further comprising:
    in response to said vibration, moving said coil sets in said magnetic field.

18. The method of claim 16 further comprising:
    in response to said vibration, moving said magnetic field.

19. The method of claim 16 further comprising:
    determining the control signal based on said data signal.

20. The apparatus of claim 1 wherein each of said first and second sets of coils winds in said magnetic field and forms a first portion having a first winding direction and a second portion having a second winding direction, said first winding direction being opposite to said second winding direction.

* * * * *